United States Patent [19]

Savall

[11] Patent Number: 4,623,466

[45] Date of Patent: Nov. 18, 1986

[54] METHOD AND APPARATUS FOR THE COUNTER-CURRENT MASS EXCHANGE BETWEEN TWO PHASES HAVING DIFFERENT DENSITIES

[75] Inventor: Vincent Savall, Velizy, France

[73] Assignee: Degremont, Rueil-Malmaison, France

[21] Appl. No.: 357,316

[22] Filed: Mar. 11, 1982

[30] Foreign Application Priority Data

Mar. 24, 1981 [FR] France ............................. 81 05813

[51] Int. Cl.$^4$ ............................................ B01D 15/02
[52] U.S. Cl. .................................... 210/634; 210/675; 210/189; 210/264; 210/268
[58] Field of Search ................ 210/634, 673, 674, 675, 210/676, 264, 268, 277, 278, 189

[56] References Cited

U.S. PATENT DOCUMENTS

| | | | |
|---|---|---|---|
| 3,136,719 | 6/1964 | Serra .................................... | 210/190 |
| 3,862,032 | 1/1975 | Dixson et al. ....................... | 210/675 |
| 4,035,292 | 7/1977 | Himsley .......................... | 210/189 X |
| 4,229,292 | 10/1980 | Mori et al. ...................... | 210/676 X |

FOREIGN PATENT DOCUMENTS 1190665 10/1959 France .
2354807 6/1977 France .
904185 8/1962 United Kingdom .

Primary Examiner—David Sadowski
Attorney, Agent, or Firm—Wenderoth, Lind & Ponack

[57] ABSTRACT

This invention provides a method and an apparatus for effecting counter-current mass exchange between two non-miscible phases A and B, for example a liquid phase A and a liquid or solid phase B, circulating in opposite directions from one end to an opposite end of a vertical tower comprising a plurality of superposed chambers in which the first phase A is caused to circulate continuously and the second phase B is caused to circulate discontinuously. One chamber is empty and is adapted to receive the phase B contained in the next chamber thereabove, the two chambers being isolated from any supply of phases A and B. A small fraction of the liquid phase A is diverted for directing continuously this phase to the other chambers of the tower, the thus diverted fraction being introduced into the next chamber above the empty chamber for carrying away the phase B contained in the lower empty chamber, this diverted fraction being reintroduced into the circuit.

14 Claims, 3 Drawing Figures

Fig: 1

METHOD AND APPARATUS FOR THE COUNTER-CURRENT MASS EXCHANGE BETWEEN TWO PHASES HAVING DIFFERENT DENSITIES

BACKGROUND OF THE INVENTION

The present invention relates to a method and an apparatus, for performing a counter-current mass exchange between two phases having different densities, notably between a liquid phase and a solid phase, such as an ion exchange resin, or between two non-miscible liquid phases. This invention is applicable to any liquid/solid or liquid/liquid exchange technique, and more particularly to the field of hydrometallurgy for recovering metal ions in a concentrated form from solutions for attacking ores, notably uranium ore, for instance.

Many methods have already been proposed in the art of ion exchange between a liquid phase to be purified and solid particles such as ion exchange resins, the liquid and the ion exchange resins flowing in counter-current relationship in at least one vessel. These known ion exchange methods are either continuous or discontinuous, and take place in a fluidized or compact bed. The difficulties arising from the practical application of these various procedures relate more particularly to the resin circulation and are caused primarily by the necessity of discharging the more or less saturated resins during the exchange by taking advantage of the components eliminated from the liquid phase flowing in counter-current relationship, thus gradually reducing the efficiency of the process. As a rule, the liquid phase circulation is discontinued to permit the transfer of the saturated resins by pumping. Other methods involving a continuous transfer of resins are objectionable in that they are ill-suited for transferring one fraction of the resins as a function of their specific granulometry, since the resins having the same granulometry tend to lie in the same contact area. Even in case of initially homogeneous resin granulometry, this granulometry is rapidly modified by wear or attrition.

In an attempt to cope with these various drawbacks, a known proposition consisted in transferring the solid phase, notably the ion exchange resins, by blowing compressed air, but this obviously involves the use of an additional source of energy and is attended by the risk of clogging the transfer piping and developing foam, in case the liquid to be treated contains surface-active substances.

Another known method utilizes an exchange tower comprising a series of contact zones separated by baffle plates providing a central aperture between these contact zones to permit the counter-current flow of the liquid to be treated, and also of the ion exchange resins, the latter being recycled from one zone to another by pumping an output flowing in closed-circuit conditions in both zones. This method is also attended by various inconveniences. Thus, the magnitude of the recycled output involves a local state of hydraulic unbalance at the level of the central aperture between the baffle plates. This strongly disturbed zone is highly detrimental to the ion exchange operation. This recycling from one zone to another implies the use of filter elements which are difficult to maintain. Finally, the use of several pumps is required.

SUMMARY OF THE INVENTION

It is the primary object of the present invention to avoid the inconveniences set forth hereinabove, by providing a method of performing a counter-current mass exchange between two non-miscible phases A and B having different densities, which method comprises the steps of:
  causing the continuous counter-current flow of the first liquid phase A and the intermittent counter-current flow of the second liquid or solid phase B to circulate from one end to the opposite end of a vertical tower comprising a plurality of superposed chambers;
  one of the chambers being empty and thus adapted to receive the solid or liquid phase B from the next chamber above, isolating the two chambers from any supply of solid phase B or liquid phase A;
  diverting a small amount of the output of liquid phase A still delivered to the other chambers of the tower;
  introducing the thus diverted fraction of the A-phase liquid output into the chamber overlying the aforesaid empty chamber, so as to carry away the solid or liquid phase B therein and direct same into the underlying empty chamber; and,
  re-introducing this diverted fraction of phase A into the circuit followed by this phase,
and so forth, as phase B is transferred from one chamber to another, the continuous flow of phase A and transfer of phase B from one chamber to another being obtained by using a single pump.

The fraction diverted from the main output of liquid phase A, which is capable of transferring phase B from one chamber to another, advantageously amounts to 5% to 20% of the main output.

The first liquid phase A circulates continuously upwards through the tower, when the density of the second liquid or solid phase B is greater than that of phase A.

Phase A flows continuously downwards in the tower when the density of phase B circulating intermittently is lower than that of phase A.

The counter-current mass exchange according to the method of the present invention takes place in a fluidized bed or in a compact bed.

This invention is also directed to an apparatus for carrying out the method described hereinabove, this apparatus comprising essentially:
  a vertical tower or column, comprising:
    (a) a plurality of superposed chambers, each chamber being provided with an inlet and an outlet for the circulation of the two phases from one end to the opposite end of the tower, this circulation of the two phases taking place in opposite directions;
    (b) a plurality of valves for the continuous and successive supply of phase A to the various chambers of the tower, according to a predetermined output;
    (c) another plurality of valves for isolating, at a predetermined time, two superposed contiguous chambers, the lower such chamber being empty of phase B and of the output of phase A, and for diverting one fraction of the output, advantageously in the range of 5% to 20% of the output of phase A, such diverted fraction being utilized for transferring the phase B contained in the upper chamber into the lower chamber, free of phase A;

a balancing column for receiving the diverted fraction of the output of phase A and recycling the same to a buffer tank for the continuous supply of phase A to the apparatus;

a single pump for supplying phase A to the apparatus and transferring phase B from one chamber to another.

BRIEF DESCRIPTION OF THE DRAWINGS

The following description, made with reference to the accompanying drawings, affords a clearer understanding of the invention.

DETAILED DESCRIPTION OF THE INVENTION

Figure 1:
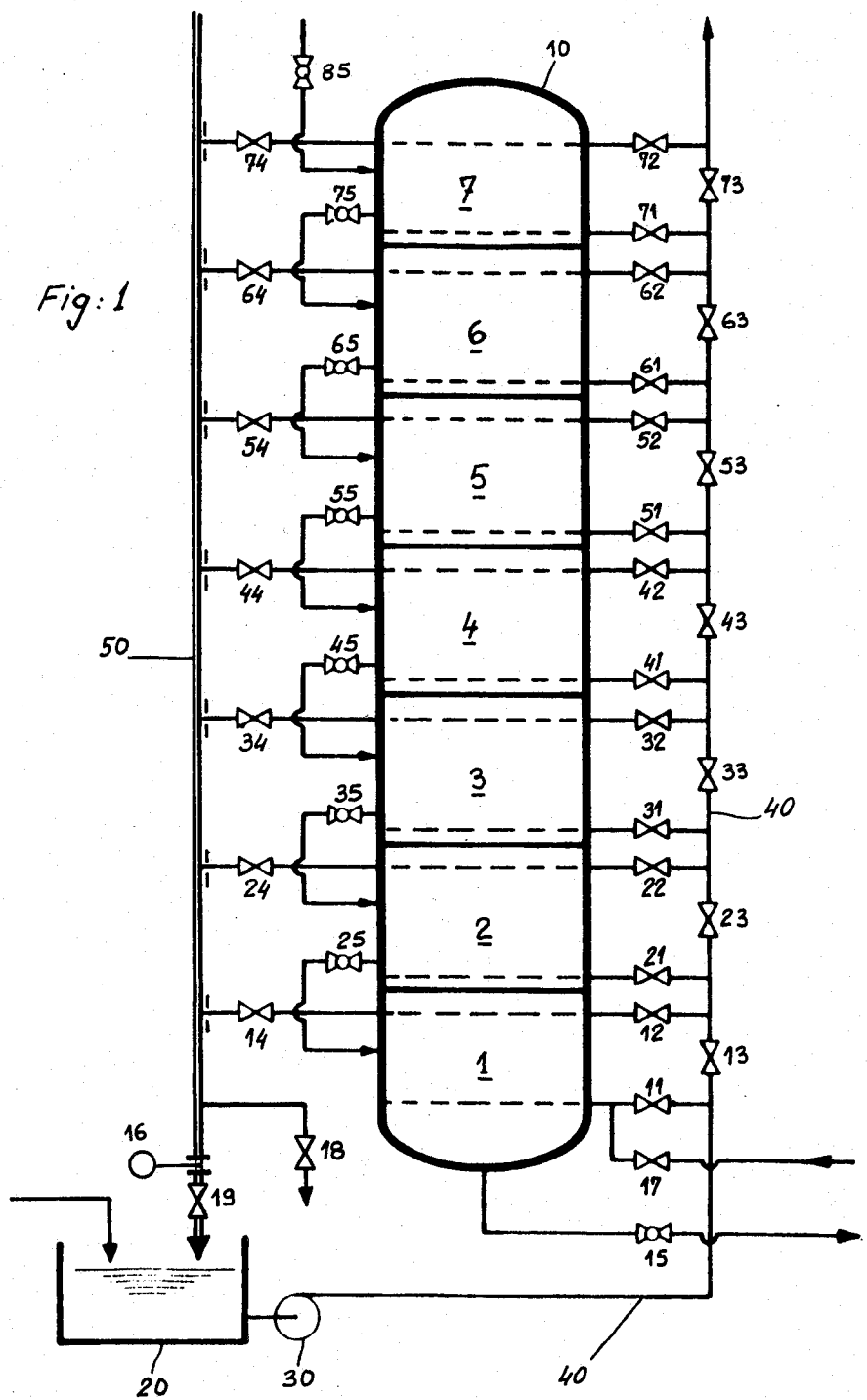
FIG. 1 is a diagrammatic vertical section showing an apparatus according to the invention and for carrying out the method of the invention; and, FIGS. 2 and 3 are diagrammatic views of means for supplying and discharging the liquid and solid phases to and from the chambers of the apparatus of FIG. 1.

An exemplary embodiment of the invention will now be described with reference to the drawings. Of course, various modifications and changes may be made to this specific embodiment without departing from the basic principles of the invention. In this example, phase A is a liquid phase, and phase B is a solid phase consisting of ion exchange resins, the mass exchange occuring in a fluidized bed.

The apparatus of this invention comprises a vertical tower or column 10, comprising seven superposed chambers denoted 1 to 7, and fed continuously with a liquid phase from a buffer tank 20, by means of a pump 30 and a feed conduit 40, having a plurality of valves 13, 23, 33 . . . 73 inserted therein, for a purpose to be explained presently. This conduit 40 is connected to each chamber 1 through 7 by means of inlet branch pipes, provided with separate valves 11, 21, 31 . . . 71, and outlet branch pipes provided with separate valves 12, 22, 32 . . . 72. The solid phase, consisting of ion exchange resins, is introduced discontinuously into the upper end of the tower through a conduit provided with a valve 85, and flows from one chamber to another through branch pipes provided with valves 75, 65, 55 . . . 25, before flowing out from the bottom of the tower through an outlet conduit provided with a valve 15.

A liquid phase output Q is introduced into chamber 1 by opening the relevant valve 11, valve 13 being closed, and flows out from this chamber 1 when valve 12 is opened, so as to penetrate into the next chamber 2, as a consequence of the opening of valve 21, valve 23 being closed, whereafter the liquid phase is allowed to flow out from chamber 2 by opening valve 22, and so forth, while the resin circulates from chamber 7 to chamber 1 by successively opening valves 75, 65, . . . 25.

According to this invention, due to the discontinuous supply of solid phase to the tower, one of the chambers, for instance chamber 3, will, at a certain time, be free of solid phase.

According to this invention, the supply of both solid and liquid phases to chamber 3 and to chamber 4, disposed just above chamber 3, is discontinued by closing valves 31, 32, and 41, 42. At the same time, valves 33, 43 are opened, to maintain a continuous supply of liquid phase to the other chambers of the tower.

Still according to the invention, one fraction ΔQ of the liquid phase output Q fed to the other chambers of the tower is diverted towards chamber 4, by opening valves 41 or 42.

The diverted fraction ΔQ, corresponding to 5% to 20% of the output Q, is utilized for carrying along the resin from chamber 4 to the empty chamber 3. This transfer is obtained by opening valves 41 or 42, valve 45, inserted in the resin circulation conduit, and a valve 34, inserted in a conduit connecting chamber 3 to a balancing column or conduit 50. Since output ΔQ is relatively small, the resin will be deposited in chamber 3, and the liquid discharged into the balancing column will be recycled into the buffer tank 20 by opening a valve 19.

Thus, chamber 4 in turn is drained, and, during the next cycle, resin is transferred in the same manner from chamber 5 to the empty chamber 4, by opening valves 43 and 53 and closing valves 41, 42, 51 or 52, the output ΔQ passing through valve 51, after opening valve 55 to enable the resin carried along by output ΔQ to flow from chamber 5 to chamber 4, and opening valve 44 for directing this output into the buffer tank, via the balancing column, for recycling, and so forth.

A single flowmeter 16, disposed at the bottom of the balancing column, is sufficient for controlling the recycled output ΔQ directed towards the buffer tank, with only one of valves 14, 24, 34, . . . 74 open. This output is regulated by means of a slave valve, an auxiliary relief valve, or any other suitable and known device.

The output Q is controlled by a flowmeter (not shown). The apparatus is adapted to operate automatically, if desired.

Figure 2:
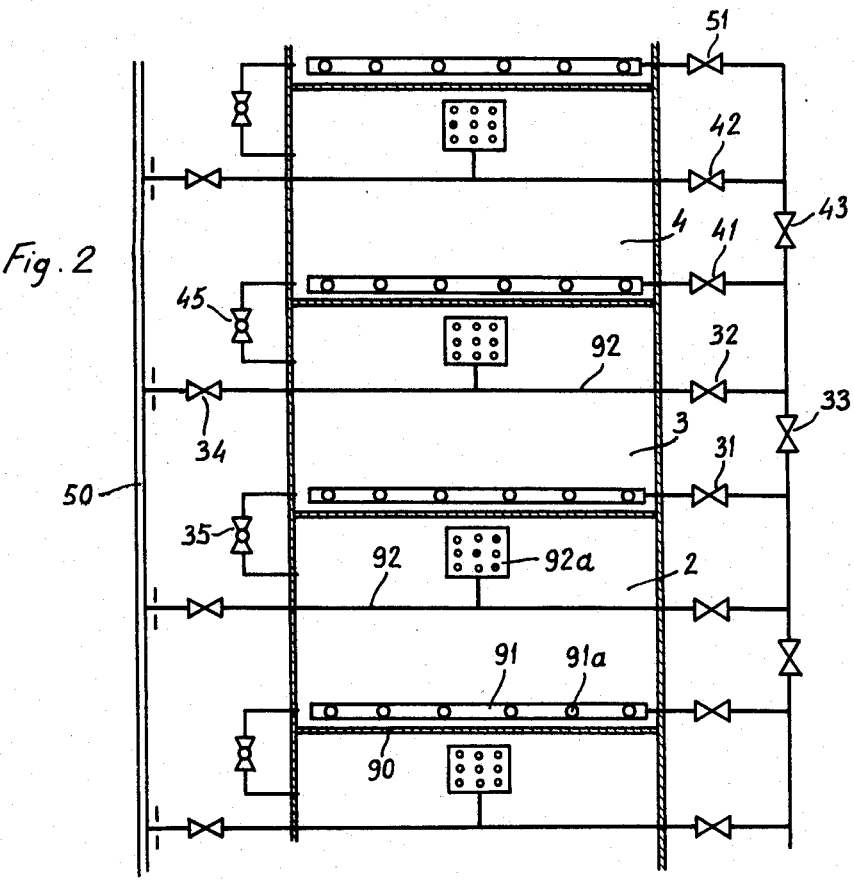
Figure 3:
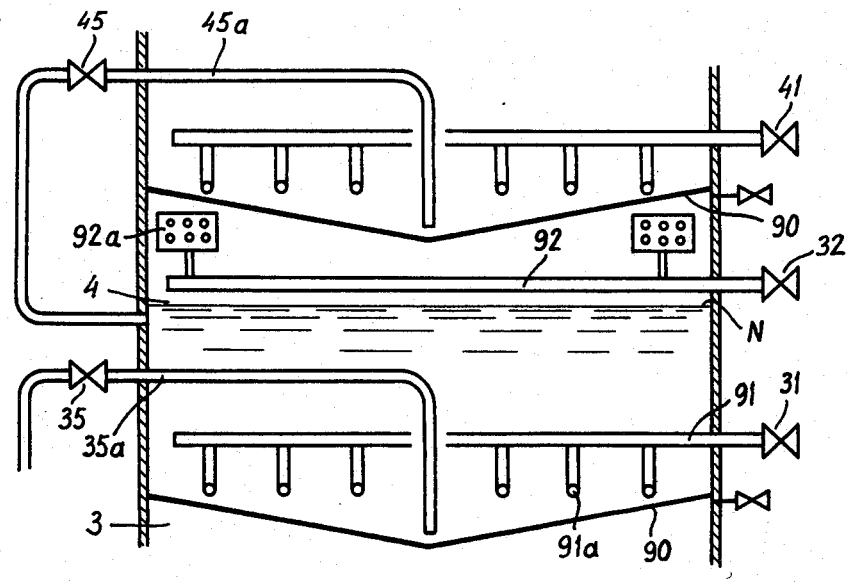

FIGS. 2 and 3 illustrate the means associated with chambers 1 through 7 for distributing and discharging the liquid and the resin. The bottoms of these chambers are either bulged, flat, (FIG. 2), or frustoconical (FIG. 3). The liquid is introduced preferably through a perforated plate 91, provided with holes or ports 91a, and is discharged through another grid 92a consisting preferably of one or a plurality of perforated boxes connected to a manifold 92 overlying the ion exchange bed having a level N, whether this bed is fluidized or not by the liquid stream.

The diameters of the holes formed in grids 91 and 92a are ten to twenty times the size of the largest resin particles. Thus, any resin particles tending to form deposits therein are quickly evacuated through conduits such as 45a, in which valves such as 45 are inserted.

The resin is advantageously washed in chamber 1 by injecting a suitable washing fluid into this chamber through a conduit provided with a valve 17, the concentrated effluents being recovered in buffer tank 20, via the balancing column 50, by opening valve 14, the lean effluents being discharged to the sewer, at the end of the washing step, by opening valve 18 and closing valve 19.

The apparatus described hereinabove by way of example, with reference to the drawings, is particularly suited for the treatment of liquids having a relatively high concentration of matters in suspension, such as the liquids implemented in hydrometallurgy. In fact, this apparatus is free of any filter element generally required for stopping the resins at the level of the supply and discharge grids, which filter elements are detrimental in that they tend to clog up relatively quickly, this rapidly increasing with the percentage of solid matter in suspension in the treated liquid. Such filter elements are no longer necessary in the apparatus according to the instant invention, the liquid constantly flowing in the same direction through the supply and discharge grids, perforated boxes or the like, which are disposed above the bed of ion exchange resins, even in the case that this bed is fluidized.

Another advantageous feature characterizing this invention lies in the limitation of the risk of resin attrition. In fact, since all the resin is transferred from one chamber to another, no valve is closed during the passage of resin therethrough, and, therefore, any risk of attrition is positively avoided.

EXAMPLE

The method of this invention is carried out with counter-current circulation, in a tower of the type illustrated in the drawings and having a cross-sectional area of 1 square meter, and comprising seven superposed chambers, each chamber having a height of 1.6 m by the following flows:

1. upwardly and continuously, a liquid phase having a density of 1.03 and containing 50 g per liter of materials in suspension, with a granulometry of $<30\mu$;
2. downwardly and discontinuously, an ion exchange resin having a density of 1.15 and a granulometry in the range of 0.4 to 1 mm.

The resin is introduced into the tower by opening valves 85, 75, 65, 55, 45, 35, valve 25 being closed, so that chamber 1 remains empty. Each one of the other chambers 2 through 7 is supplied until it contains 500 liters of ion exchange resins. The liquid phase is pumped out from the buffer tank 20 with an output of 18 cubic meters per hour, valves 11, 12, 21, 22, being closed, valves 13 and 23 being open. One fraction $\Delta Q = 1.8$ m³/h of output Q is diverted towards chamber 2 by opening valve 21 or valve 22. The liquid flows, with an output $Q - \Delta Q$ of 16.2 m³/h into chambers 3, 4, 5, 6 and 7, in which the ion exchange takes place. The 1.8 m³/h output $\Delta Q$, introduced into chamber 2 by opening valves 25, 14, and 21 or 22, causes the 500 liters of resin contained in chamber 2 to be transferred to chamber 1. This output liquid is recycled to the buffer tank by the balancing column. During the following cycle, any resin contained in chamber 2 is drained out. Then, chambers 3 and 2 are isolated in the same manner, and, thereafter, chambers 3 and 4, 4 and 5, and so forth.

The transfer of resin from one chamber to another takes about 18 minutes.

The fact of utilizing one fraction $\Delta Q$ of the output for transferring the resins does not interfere with the exchange reaction. When the resin expansion is as high as 95 percent in those chambers through which the output Q is caused to flow, for example chambers 1 and 2, when transferring the resins from chamber 4 to chamber 1, the level of the resin bed being 98 centimeters high, the resin expansion represents 85% in the upper chambers 5, 6, 7, through which output $Q - \Delta Q$ is caused to pass, the level of the resin bed being then 92 centimeters high.

Since the inlet and outlet grids for the liquid are provided with orifices having a diameter of 10 and 15 mm, no carrying away of resins through the grids, nor any clogging of the various component elements of the tower, have been observed in actual service.

What I claim is:

1. A method for the counter-current mass exchange between first and second non-miscible phases have different densities, said method comprising the steps of:
   (a) providing a vertical tower having opposite vertically spaced ends and defining a plurality of separate superposed chambers;
   (b) continuously circulating said first phase, serially in a first direction from a first end of said tower to a second end of said tower, through all of said chambers except first and second adjacent said chambers;
   (c) discontinuously circulating said second phase, serially in a second direction opposite to said first direction and from said second end of said tower to said first end of said tower, through all of said chambers except said first chamber of said adjacent chambers closest to said first end of said tower, whereby said first chamber is free of both said first phase and said second phase, said discontinuous circulation comprising;
   (d) diverting a small portion of said first phase from said serial circulation thereof and introducing said small portion into said second chamber of said adjacent chambers closest to said second end of said tower, and by said small portion of said first phase carrying away said second phase in said second chamber from said second chamber and transferring it in said second direction to said first chamber, whereby said second chamber then is free of both said first phase and said second phase;
   (e) reintroducing said small portion of said first phase into the supply of said first phase to thereby again be continuously circulated in said first direction;
   (f) adjusting said serial continuous circulation of said first phase to be through all of said chambers except said second chamber and a third chamber adjacent said second chamber in said first direction toward said second end of said tower;
   (g) periodically repeating said steps (d) through (f) to sequentially and discontinuously transfer said second phase in said second direction through said chambers;
   (h) periodically discharging said second phase from the endmost said chamber at said first end of said tower; and
   (i) continuously discharging said first phase from a said chamber adjacent said second end of said tower.

2. A method as claimed in claim 1, wherein said diverted small portion of said first phase comprises from 5% to 20% of the total circulation of said first phase.

3. A method as claimed in claim 1, wherein the density of said second phase is greater than the density of said first phase, said first phase is circulated continuously upwardly through said chambers of said tower, and said second phase is circulated discontinuously downwardly through said chambers of said tower.

4. A method as claimed in claim 1, wherein the density of said first phase is greater than the density of said second phase, said first phase is circulated continuously downwardly through said chambers of said tower, and said second phase is circulated discontinuously upwardly through said chambers of said tower.

5. A method as claimed in claim 1, wherein said second phase comprises an ion exchange resin.

6. A method as claimed in claim 5, wherein said ion exchange resin is discharged periodically from said endmost chamber of said tower for regeneration of said ion exchange resin.

7. A method as claimed in claim 5, wherein mass exchange takes place in fluidized beds of said ion exchange resin and said first phase in said chambers.

8. An apparatus for achieving counter-current mass exchange between first and second non-miscible phases having different densities, said apparatus comprising:

- a vertical tower having opposite vertically spaced ends and defining a plurality of separate superposed chambers;
- each said chamber having first inlet means and outlet means for the respective introduction and discharge of a first phase;
- each said chamber having second inlet means and outlet means for the respective introduction and discharge of a second phase;
- circulation means, including a single pump, for continuously circulating a predetermined quantity of said first phase in a first direction from a first end of said tower to a second end of said tower;
- first valve means, associated with said first inlet means and outlet means and with said circulation means, for passing said continuous circulation of said first phase serially through said chambers in said first direction;
- second valve means, associated with said circulation means and with said first inlet means and outlet means, for isolating at a given time selected first and second adjacent said chambers from said continuous circulation of said first phase;
- means for discontinuously circulating said second phase, serially in a second direction opposite to said first direction and from said second end of said tower to said first end of said tower, through said chambers except for said first chamber of said selected adjacent chambers closest to said first end of said tower, said second phase circulating means comprising:
- means for diverting a small portion of said first phase from said continuous circulation thereof and introducing said small portion into said second chamber of said selected adjacent chambers closest to said second end of said tower, such that said small portion of said first phase under the influence of said single pump carries away said second phase in said second chamber from said second chamber and transfers it through the respective second outlet means and inlet means in said second direction to said first chamber, whereby said second chamber then is free of both said first phase and said second phase; and
- means, associated with said respective second outlet means and inlet means, for reintroducing said small portion of said first phase into the supply of said first phase to thereby again be continuously circulated in said first direction;
- means for periodically discharging said second phase from the endmost said chamber at said first end of said tower; and
- means for continuously discharging said first phase from a said chamber adjacent said second end of said tower.

9. An apparatus as claimed in claim 8, wherein said first inlet means and outlet means comprise perforated members having perforations of a size several times larger than the largest particle size of said second phase.

10. An apparatus as claimed in claim 8, wherein each said chamber has a flat bottom.

11. An apparatus as claimed in claim 8, wherein each said chamber has a bulged bottom.

12. An apparatus as claimed in claim 8, wherein each said chamber has a frusto-conical bottom.

13. An apparatus as claimed in claim 8, wherein each said second inlet means and outlet means comprises a respective valved conduit extending from one said chamber to the next adjacent lower said chamber.

14. An apparatus as claimed in claim 8, wherein said reintroducing means comprises, for each said chamber, a valved conduit extending from the respective chamber, a balancing conduit connected to said valved conduits of all said chambers, and a buffer tank receiving said small portion of said first phase from a discharge of said balancing conduit, said single pump withdrawing said first phase from said buffer tank.

* * * * *